United States Patent [19]

Marsais et al.

[11] Patent Number: 5,526,873
[45] Date of Patent: Jun. 18, 1996

[54] HEAT EXCHANGER APPARATUS FOR A PLURALITY OF COOLING CIRCUITS USING THE SAME COOLANT

[75] Inventors: Christian Marsais, Rambouillet; Michel Simonin, Montigny, both of France

[73] Assignee: Valeo Thermique Moteur, Le-Mesnil-Saint-Denis, France

[21] Appl. No.: 955,232

[22] Filed: Oct. 2, 1992

Related U.S. Application Data

[63] Continuation of Ser. No. 680,398, Apr. 4, 1991, abandoned, which is a continuation of Ser. No. 381,950, Jul. 19, 1989, abandoned.

[51] Int. Cl.$^6$ ................................. F01P 1/06; F01P 3/12; F01P 11/08
[52] U.S. Cl. ..................... 165/51; 165/140; 165/150; 165/139; 165/41; 123/41.31; 123/41.33
[58] Field of Search ............................. 165/51, 140, 150, 165/41, 139; 123/41.33, 41.31, 41.1

[56] References Cited

U.S. PATENT DOCUMENTS

| | | | |
|---|---|---|---|
| 1,948,929 | 2/1934 | MacPherson | 165/140 |
| 2,008,164 | 7/1935 | Wolf | 165/51 |
| 2,013,708 | 9/1935 | Bianchi et al. | 165/51 |
| 2,188,172 | 1/1940 | Brehob | 165/103 |
| 2,264,820 | 12/1941 | Young | 165/150 |
| 2,505,790 | 5/1950 | Panthofer | 165/140 |
| 3,989,103 | 11/1976 | Cieszko et al. | 165/150 |
| 4,432,410 | 2/1984 | Cadars | 123/41.1 |
| 4,535,729 | 8/1985 | Faylor | 123/41.33 |
| 4,640,341 | 2/1987 | Ozawa | 165/51 |
| 4,923,001 | 5/1990 | Marcolin | 165/140 |

FOREIGN PATENT DOCUMENTS

| | | | |
|---|---|---|---|
| 2596858 | 10/1987 | France | 165/150 |
| 1041724 | 9/1983 | U.S.S.R. | 123/41.33 |
| 255331 | 7/1926 | United Kingdom | 165/140 |

*Primary Examiner*—John K. Ford
*Attorney, Agent, or Firm*—Dennison, Meserole, Pollack & Scheiner

[57] ABSTRACT

A heat exchanger apparatus for a plurality of cooling circuits using the same coolant is proposed, which includes a first fluid tank (18) arranged to be supplied with the coolant and divided into a plurality of compartments (24, 26, 28) for supplying at least two sub-banks (FP, FS) of tubes belonging to the same bank (10) of heat exchanger tubes (12), the bank (10) being mounted at one end on the first fluid tank (18) and at another end on a second fluid tank (22) that is divided into a plurality of compartments (38, 40, 42) communicating with the sub-banks, outlet means (48, 36) being provided on the first and second fluid tanks to permit the connection of each sub-bank to a cooling circuit.

13 Claims, 3 Drawing Sheets

HEAT EXCHANGER APPARATUS FOR A PLURALITY OF COOLING CIRCUITS USING THE SAME COOLANT This is a continuation of application Ser. No. 07/680,398 filed on Apr. 4, 1991, now abandoned, which is a continuation of application Ser. No. 381,950 filed on Jul. 19, 1989, now abandoned.

FIELD OF THE INVENTION

The invention relates to a heat exchanger apparatus for a plurality of cooling circuits using the same coolant, in particular for automobiles.

BACKGROUND OF THE INVENTION

For cooling an internal combustion engine of an automobile, a cooling circuit has been conventionally used, arranged to cause a coolant fluid, generally water with antifreeze added, to circulate through the engine block in order to absorb its thermal energy and return it to the ambient air by thermal exchange with the air in a heat exchanger, commonly called a cooling radiator.

It is also known to use this coolant in one or more secondary cooling circuits, particularly for cooling the oil lubricating the engine, or to cool the supercharging air coming from a turbocharger. The secondary circuit, or each secondary circuit, then includes a secondary heat exchanger, which is connected in series with the main heat exchanger serving to cool the engine.

This provision is not satisfactory, because thermal antagonisms make it impossible to optimize either the size or the thermal output of the heat exchangers.

In fact, it is necessary for the secondary exchangers to operate at a much lower temperature than the main exchanger serving to cool the engine.

Moreover, the exchanger intended for cooling the supercharging air must operate with relatively low outputs, while the exchanger intended to cool the oil must operate with much higher outputs.

Another reason this known provision is not satisfactory is that it necessitates providing several heat exchangers, thus increasing the size of the engine compartment.

From U.S. Pat. No. 4,535,729, a heat exchanger is also known, arranged to supply two cooling circuits in parallel, one intended for cooling the engine and the other for cooling the oil. To do this, the exchanger includes a fluid tank supplied with the coolant and in turn supplying two heat exchange tube banks, these banks being formed of the same front row of tubes that discharge respectively into two chambers provided longitudinally in a second water tank. These two chambers, separated by a longitudinal partition, supply the cooling circuit for the engine and the the cooling circuit for the oil, respectively.

This apparatus is not satisfactory, because the two banks do not have the same cooling coefficient, because of the fact that the cooling air passes successively through a first and a second layer of tubes. Hence the second layer is cooled by the air that has already been reheated by thermal exchange with the first layer. Moreover, this apparatus cannot be used in the case where the radiator includes only a single row of tubes.

Nor can this exchanger be used for supplying more than two cooling circuits.

SUMMARY OF THE INVENTION

According to the invention, the apparatus includes a first fluid tank arranged to be supplied with the coolant fluid and divided into a plurality of compartments, to supply at least two sub-banks of tubes that belong to the same bank of heat exchanger tubes, the bank being connected at one end to the first fluid tank and at another end to a second fluid tank divided into a plurality of compartments communicating with the sub-banks, outlet means being provided on the first and second fluid tank to permit the connection of each sub-bank to one cooling circuit.

The result is accordingly a heat exchanger apparatus using a single bank of tubes for a plurality of cooling circuits using the same coolant.

Advantageously, the compartments of the first fluid tank and of the second fluid tank are defined by internal partitions extending transversely with respect to the longitudinal direction of the tank, which is perpendicular to the direction of the tubes of the bank.

This arrangement makes it possible to have a plurality of successive compartments inside one fluid tank along the longitudinal direction of the water tank. Thus sub-banks are obtained that all have the same cooling coefficient, and that if desired permit a circulation of fluid in a plurality of passes, in alternating directions, within the same sub-bank.

In one embodiment of the invention, the first fluid tank includes a main compartment, into which an inlet neck discharges that is arranged to be connected to a source of coolant, and at least one secondary compartment separated from the main compartment by a partition; the second fluid tank includes a main compartment into which a main outlet neck discharges that is arranged to be connected to a main cooling circuit and at least one secondary compartment separated from the main compartment by a partition. The bank of tubes thus includes a main sub-bank communicating with the main compartment of the first fluid tank and the main compartment of the second fluid tank, and at least one secondary sub-bank communicating with at least one secondary compartment of the first fluid tank and at least one secondary compartment of the second fluid tank; at least one secondary outlet neck discharges into a secondary compartment of the first fluid tank, or the second fluid tank, in order to connect it to a secondary cooling circuit.

To assure the supply to the secondary compartment, or each secondary compartment, of the first fluid tank, it may be provided that the main compartment of this first fluid tank communicates with a secondary compartment of the same tank via a calibrated opening made in the partition separating them. In a variant embodiment, the main compartment of the first fluid tank communicates with a secondary compartment of the same fluid tank via at least one tube of the bank connecting this main compartment to a secondary compartment of the second fluid tank, and via at least one other tube of the bank connecting this latter secondary compartment with the secondary compartment of the first fluid tank.

The invention is applicable in particular to an apparatus including one main sub-bank, intended for example for cooling an engine of an automobile, and one secondary sub-bank, intended for example for cooling the lubricating oil and/or the transmission.

It also applies to an apparatus including a main sub-bank, intended for instance to cool an engine of an automobile, and two secondary sub-banks, intended respectively for cooling the oil and for cooling the supercharging air.

In the case where the apparatus includes one main sub-bank and two secondary sub-banks, these two sub-banks may be disposed on the same side of the main sub-bank, or in a variant on either side of this main sub-bank.

In another embodiment of the invention, the first fluid tank includes a main inlet neck, discharging into the main compartment and arranged to supply the main sub-bank and one secondary sub-bank, and a secondary inlet neck discharging into another secondary compartment, arranged to supply another secondary sub-bank directly.

The ensuing description is given solely by way of example and will enable better understanding of the invention, referring to the accompanying drawings.

DESCRIPTION OF THE PREFERRED EMBODIMENTS

Figure 1:
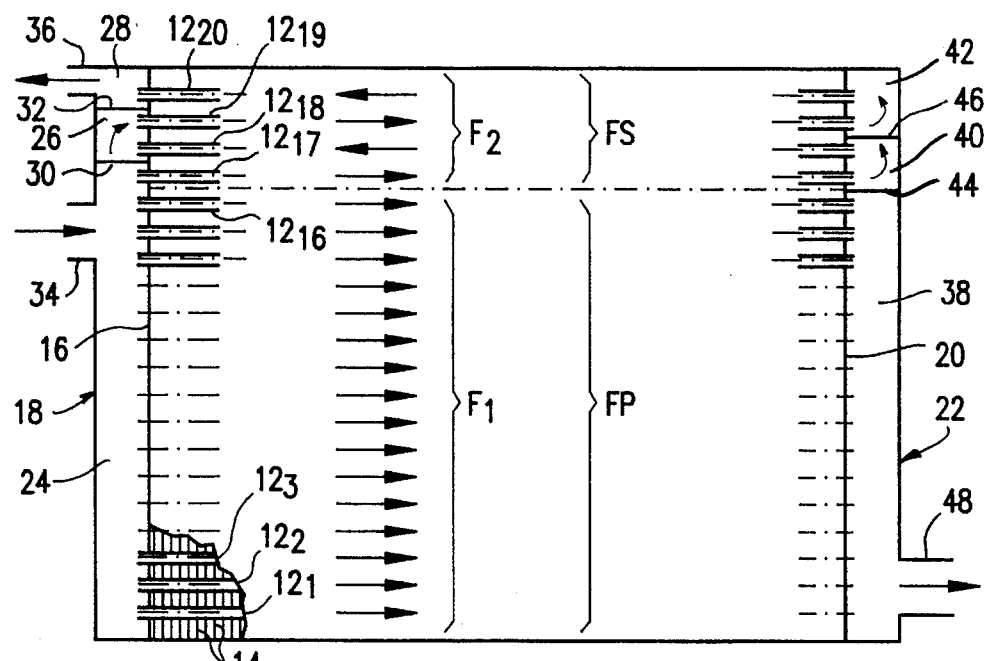
FIG. 1 is a schematic sectional view of a heat exchanger apparatus according to the invention, including two sub-banks.

Turning first to FIG. 1, a heat exchanger is shown including a bank 10 comprising a multiplicity of tubes 12 (in this example, twenty tubes identified by reference numerals 12-1 through 12-20), which extend parallel to one another and perpendicularly to a multiplicity of fins 14 that are parallel to one another. For the sake of clarity in the drawing, only some of the tubes 12 and fins 14 have been shown. The tubes 12 are connected at one end to the collector 16 of a first fluid tank 18 and at their other end to the collector 20 of a second fluid tank 22. The fluid tank 18 is divided into a plurality of compartments, that is, one main compartment 24 and two secondary compartments 26 and 28, the division being effected by two transverse partitions 30 and 32. The fluid tank 18 is also provided with a main inlet neck 34 discharging into the compartment 24 and arranged to supply it with coolant, as well as an outlet neck 36 arranged to supply a secondary cooling circuit, for example a circuit for cooling oil.

The fluid tank 22 is divided into a plurality of compartments, that is, one main compartment 38 and two secondary compartments 40 and 42, by means of two partitions 44 and 46. The fluid tank 22 is also provided with a main outlet neck 48 communicating with the compartment 38 and arranged to supply a main cooling circuit, for example the circuit for cooling an internal combustion engine.

The internal partitions 30 and 32 of the fluid tank 18 and the internal partitions 44 and 46 of the fluid tank 22 extend transversely with respect to the longitudinal direction of these tanks, and this longitudinal direction itself is perpendicular to the direction of the tubes of the bank.

The bank 10 includes a main sub-bank FP, in this example comprising sixteen tubes (tubes 12-1 through 12-16) of the bank, and a secondary sub-bank FS, in this example embodied by four tubes of the bank (tubes 12-17 through 12-20), the respective sub-banks being formed in each case by a longitudinal portion of the front row of tubes extending over the entire length of the heat exchanger.

The set of tubes comprising the main sub-bank FP communicates at one end, in the compartment 24, with the fluid tank 18 and at its other end, in the compartment 38, with the fluid tank 22.

The coolant introduced into the compartment 24 thus flows across the set of tubes of the main sub-bank FP and reaches the compartment 38 of the fluid tank 22; the circulation of coolant in this sub-bank takes place in a single pass, in the direction of the arrows F1.

The secondary sub-bank FS is supplied with coolant via at least one of the tubes of the sub-bank FS, in this case a single one of them, that is, the tube 12-17, one end of which communicates with the compartment 24 of the fluid tank 18 and the other end of which discharges into the compartment 40 of the fluid tank 22. The coolant circulates in the sub-bank FS in the following manner: The fluid reaches the compartment 40 via the tube 12-17, then the compartment 26 via the tube 12-18, next the compartment 42 via the tube 12-19, and finally the compartment 28 via the tube 12-20, and leaves the heat exchanger via the neck 36. Thus the coolant circulates in the sub-bank FS in a plurality of passes in alternating directions, in this example in four passes, as indicated by the four arrows F2.

With the exchanger of FIG. 1, the great majority of the output of coolant flows via the main outlet neck 48, while a small portion of the output flows via the secondary outlet neck 36, which makes it possible to attain a lower fluid temperature downstream of the neck 36 than that downstream of the neck 48. By way of example, for a coolant temperature of approximately 100° C., arriving via the inlet neck 34, the fluid temperature as it leaves via the neck 48 is on the order of 95° C., while the temperature of the fluid leaving via the neck 36 is on the order of 60° C. Thus the apparatus of FIG. 1 can be used for cooling an automobile engine by means of the output of fluid leaving via the neck 48, and the cooling of the engine oil and/or of the transmission can be done by the output of fluid leaving via the neck 36.

Figure 2:
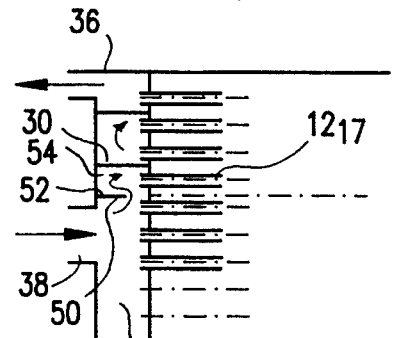
FIG. 2 is a partial view of the apparatus of FIG. 1, in a variant embodiment.

Turning now to FIG. 2, a variant embodiment of the heat exchanger of FIG. 1 is shown. In this variant, the coolant supplies the tube 12-17 of the secondary sub-bank FS via a calibrated opening 50 made in an internal partition 52, thus forming a supplementary secondary compartment 54 jointly defined by the partition 30. Precise regulation is thus possible of the fraction of the coolant output that enters the compartment 54 and thus supplies the tube 12-17 and consequently all of the sub-bank.

Figure 3:
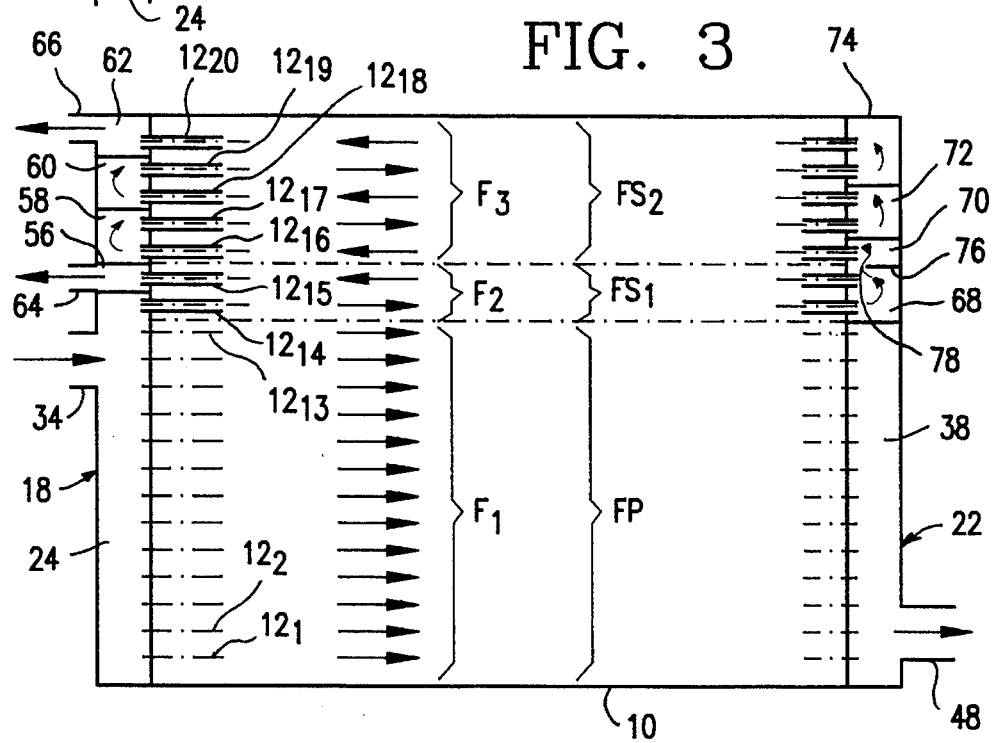
FIG. 3 is a longitudinal sectional view of a heat exchanger apparatus including three sub-banks.

Turning now to FIG. 3, another heat exchanger is shown, intended for supplying three cooling circuits.

The fluid tank 18 here includes one main compartment 24 and four secondary compartments 56, 58, 60 and 62, separated from one another by four transverse partitions (not identified by reference numerals in the drawing). The fluid tank 18 includes one main inlet neck 34 discharging into the compartment 24 and two secondary outlet necks 64 and 66, communicating with the compartments 56 and 62, respectively.

The fluid tank 22 includes a main compartment 38 and four secondary compartments 68, 70, 72 and 74, separated from one another by four transverse partitions (not identified by reference numeral in the drawing). The fluid tank 22 includes one main outlet neck 48, which communicates with the main compartment 38. The bank 10 includes one main sub-bank FP, in this example comprising 13 tubes 12-1 through 12-13, one first secondary sub-bank FS1, in this example comprising two tubes 12-14 and 12-15, and one second secondary sub-bank FS2, in this example comprising five tubes 12-16 through 12-20. Moreover, the compartments 68 and 70 of the fluid tank 22 are separated by a partition 76 provided with a calibrated opening 78 providing for communication between these two compartments.

The heat exchanger of FIG. 3 functions as follows. The coolant reaches the compartment 24 of the fluid tank 18. The great majority of the output passes via the tubes 12-1 through 12-13 of the main sub-bank FP and reaches the compartment 38, and then leaves the heat exchanger via the neck 48. Another portion of the fluid passes via the tube 12-14, reaches the compartment 68, and then reaches the compartment 56 via the tube 12-15, with a fraction of the output thus leaving the heat exchanger via the neck 64. A fraction of the output coming from the compartment 68 reaches the compartment 70 via the calibrated opening 78 and thus supplies the second secondary sub-bank FS2. The fluid thus successively reaches the compartment 58, the compartment 72, the compartment 60, the compartment 74, and finally the compartment 62, and leaves the exchanger via the neck 66.

In the main sub-bank FP, the fluid circulates in a single pass, always in the same direction, as shown by the arrows F1. In the sub-bank FS1, the fluid circulates in two passes in alternating directions, as shown by the two arrows F2, and in the sub-bank FS2 the fluid circulates in five passes, in alternating directions, as indicated by the five arrows F3.

The exchanger of FIG. 3 can be used for supplying the cooling circuit of an engine connected downstream of the neck 48, and oil cooling circuit connected downstream of the neck 64, and a supercharging air cooling circuit connected downstream of the neck 66.

Figure 4:
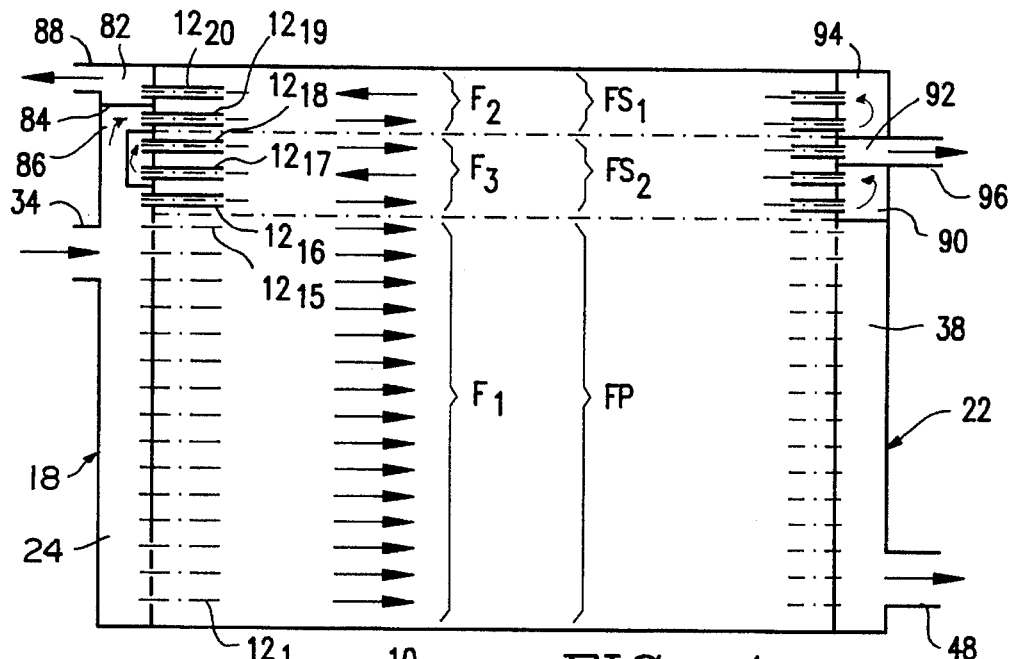
FIG. 4 is a longitudinal sectional view of another apparatus including three sub-banks.

Turning now to FIG. 4, in this embodiment the fluid tank 18 includes one main compartment 24 and one secondary compartment 82, and these two compartments are separated by an internal partition 84. Furthermore, inside the compartment 24, a chamber 86 is defined which puts the tubes 12-17 and 12-18 into communication while permitting the tube 12-19 to be supplied directly via the main compartment. The fluid tank 18 includes one inlet neck 34 discharging into the main compartment 24 and one outlet neck 88 communicating with the compartment 82. The fluid tank 22 includes one main compartment 38 and three secondary compartments 90, 92 and 94, separated from one another by transverse internal partitions of the fluid tank. The compartment 38 discharges at a main outlet neck 48, and the compartment 92 discharges at a secondary outlet neck 96.

The bank 10 here includes one main bank FP, comprising the tubes 12-1 through 12-15, one secondary bank FS1 comprising the tubes 12-19 and 12-20, and one secondary bank FS2 comprising the tubes 12-16 through 12-18. The coolant penetrating the compartment 24 supplies both the fifteen tubes of the bank FP, on the one hand, and the tube 12-16 of the sub-bank FS2 and the tube 12-19 of the sub-bank FS1, on the other.

The coolant circulates in a single pass in the tubes FP, as indicated by the arrows F1, in two passes in alternating directions in the tubes of the sub-bank FS1, and in three passes in alternating directions in the tubes of the sub-bank FS2. Thus in this embodiment, the fluid tank 18 includes two connecting necks, the necks 34 and 38, and the fluid tank 22 likewise includes two connecting necks, the necks 48 and 96.

Figure 5:
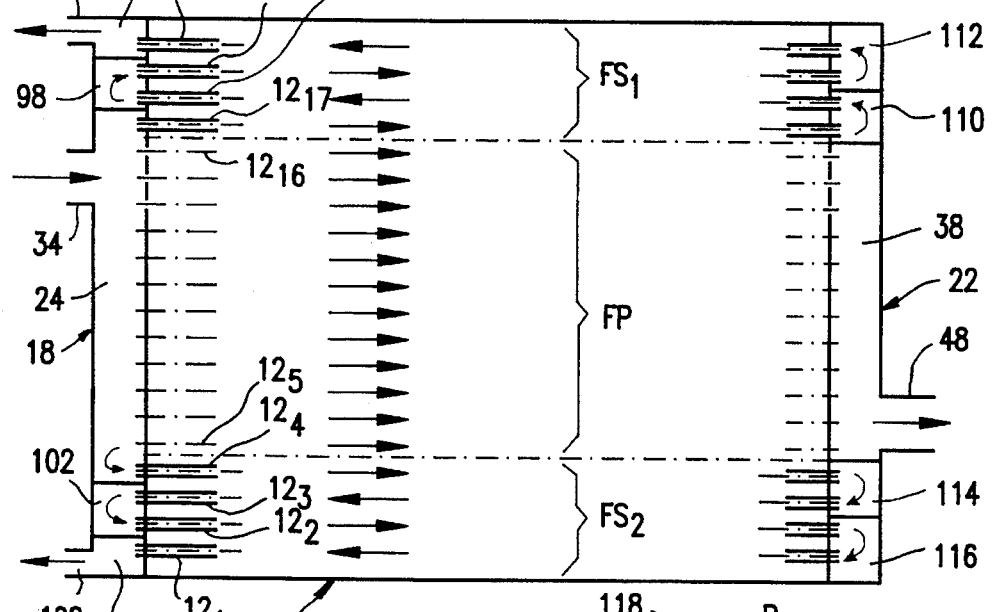
FIG. 5 is a longitudinal sectional view of another apparatus including three sub-banks.

In the embodiment of FIG. 5, the fluid tank 18 includes a main compartment 24, and on one side two secondary compartments 98 and 100 and on the other side two secondary compartments 102 and 104. The fluid tank 18 includes three connecting necks: one main inlet neck 34 communicating with the compartment 24, and two secondary outlet necks 106 and 108 communicating with the compartments 100 and 104, respectively. The fluid tank 22 includes one main compartment 38 and, on one side, two secondary compartments 110 and 112 and, on the other side, two secondary compartments 114 and 116. The fluid tank 22 includes a single connecting neck, that is, a main outlet neck 48.

The bank 10 includes one main sub-bank FP, comprising the tubes 12-5 through 12-16; one secondary sub-bank FS1, comprising the tubes 12-17 through 12-20; and one secondary sub-bank FS2, comprising the tubes 12-1 through 12-4. The coolant penetrating the main compartment 24 of the fluid tank 18 supplies the tubes 12-5 through 12-16 of the sub-bank FP, the tube 12-17 of the sub-bank FS1 and the tube 12-4 of the sub-bank FS2.

The fluid thus traverses the tubes of the sub-bank FP in a single pass, as indicated by the arrows F1, to reach the compartment 38 and the main outlet neck 48.

The fraction of coolant that enters the tube 12-17 then travels successively through the tubes 12-17 through 12-20 in four passes, in alternating directions, as indicated by the arrows F2, to reach the compartment 100 and the neck 106. Similarly, the fraction of fluid supplying the tube 12-4 passes successively through the tubes 12-4, 12-3, 12-2 and 12-1 in four passes, in alternating directions, as indicated by the arrows F3, to reach the compartment 104 and the neck 108.

In the embodiment of FIG. 5, the two secondary sub-banks FS1 and FS2 are located on either side of the main sub-bank FP, while in the embodiment of FIGS. 3 and 4, the sub-banks FS1 and FS2 were both located on the same side of the main sub-bank FP.

The outlet neck 106 can be connected for example to an oil cooling circuit, and the outlet neck 108 can be connected to a circuit for cooling the supercharging air.

Figure 6:
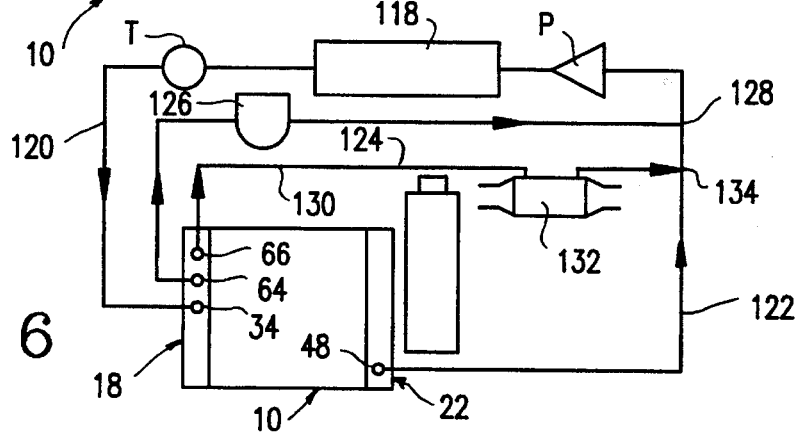
FIG. 6 schematically shows a cooling system including three cooling circuits supplied by the apparatus of FIG. 3.

Turning now to FIG. 6, a cooling system having three cooling circuits is shown, using a heat exchanger identical to that shown in FIG. 3. The coolant leaving an engine 118 reaches the inlet neck 34 of the exchanger via a conduit 120 on which a thermostat T is mounted. The great majority of the output of coolant leaves the exchanger via the main outlet neck 48, which is connected to the inlet of the engine via a conduit 122, on which a pump P is mounted that is arranged to cause the fluid to circulate in the directions indicated by the arrows. The outlet neck 64 discharges at a conduit 124, on which an oil cooler 126 is mounted. This conduit 124 discharges at a point 128 of the conduit 122. The outlet neck 66 supplies a conduit 130 on which a supercharging air cooler 132 is mounted. This conduit 130 discharges at a point 134 of the conduit 122. Thus the heat exchanger enables parallel cooling of the vehicle engine, the lubricating oil and/or the vehicle transmission, and finally the supercharging air coming from a turbocharger.

Figure 7:
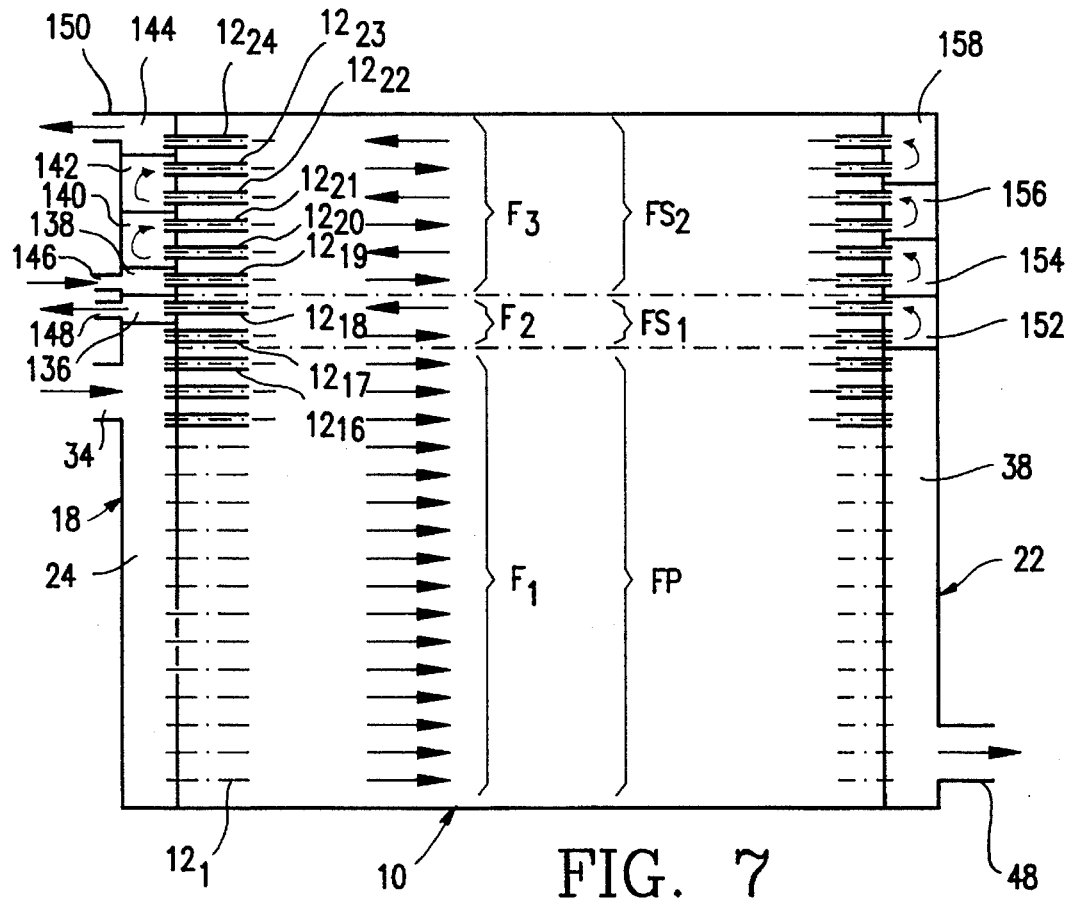
FIG. 7 is a longitudinal sectional view of a heat exchanger apparatus including three sub-banks and two inlet necks.

Turning now to FIG. 7, a heat exchanger is shown for three cooling circuits in accordance with a different variant.

The fluid tank 18 includes one main compartment 24 and five secondary compartments 136, 138, 140, 142 and 144, separated from one another by transverse partitions in the interior of the fluid tank. The fluid tank includes four connecting necks: a main inlet neck 34 communicating with the compartment 24; a secondary inlet neck 146 communicating with the compartment 138; and two secondary outlet necks 148 and 150 communicating with the compartments 136 and 144, respectively.

The fluid tank 22 includes a main compartment 38 and four secondary compartments 152, 154, 156 and 158, separated from one another by internal transverse partitions of the fluid tank. This fluid tank includes a single connecting neck: a main outlet neck 48 communicating with the compartment 38.

In this example, the bank of tubes 10 includes twenty-four tubes: the tubes 12-1 through 12-16 comprising the main sub-bank FP; the tubes 12-17 and 12-18 comprising the secondary sub-bank FS1; and the tubes 12-19 through 12-24 comprising the secondary sub-bank FS2. In the tubes 12-1 through 12-16, the fluid circulates in a single pass from the compartment 24 to the compartment 38, and from there reaches the outlet neck 48. A fraction of the output of coolant leaves the compartment 24 via the tube 12-17, and the fluid thus reaches the compartment 152 and then, via the tube 12-18, the compartment 136 and the outlet neck 148. In the sub-bank FS1, the circulation of fluid takes place in two passes, in alternating directions, as indicated by the arrow F2.

A portion of the coolant enters the compartment 138, via the inlet neck 146. From there, the fluid reaches the compartment 154 via the tube 12-19. The fluid then successively circulates through the tubes 12-20 through 12-24 and reaches the compartment 144 and the outlet neck 150. In the sub-bank FS2, the circulation takes place in six passes, in alternating directions as indicated by the arrows F3.

Figure 8:
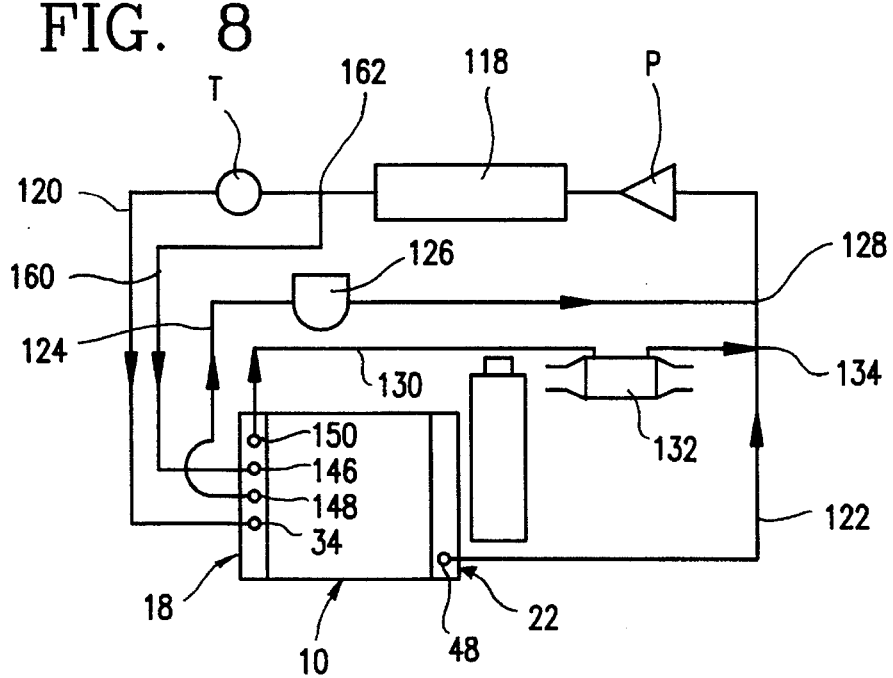
FIG. 8 schematically illustrates a cooling system including three cooling circuits supplied by the apparatus shown in FIG. 7.

Turning now to FIG. 8, a cooling system that is a derivative of the system shown in FIG. 6 and uses a heat exchanger identical to that of FIG. 7 is shown. Elements common to the systems of both FIGS. 6 and 8 are identified by the same reference numerals. As in the case of FIG. 6, the coolant leaves the engine 118 via a conduit 120 in order to supply the heat exchanger via a main inlet neck 34. The majority of the output of fluid leaves this exchanger via an outlet neck 48, which is connected to the inlet of the engine 118 via a conduit 122.

The secondary outlet necks 148 and 150 of the exchanger are connected to the conduits 124 and 130, respectively, in order to supply the oil cooler 126 and the supercharging air cooler 132, respectively.

In the particular case of FIG. 8, a bypass 160 is also provided, which is connected on the one hand at a point 162 to the conduit 120 located between the engine outlet and the thermostat T, and on the other hand to the secondary inlet neck 146. The thermostat T block access to the main inlet neck 34 below a predetermined temperature, and allows this access above this predetermined temperature. On the other hand, the secondary inlet neck 146 is supplied permanently with the coolant coming from the engine.

Thus, if the temperature of the coolant is lower than the set-point temperature of the thermostat, only the secondary inlet neck 146 is supplied. Consequently, only the secondary bank FS2 functions and thus assures the cooling of the supercharging air. When the coolant temperature exceeds the set-point temperature of the thermostat, the coolant is then simultaneously supplied to the inlet necks 34 and 146, so that the three sub-banks FP, FS1 and FS2 are supplied in parallel to assure the cooling of the engine, the oil and the supercharging air, respectively.

In the various embodiments shown in the drawings, the sub-banks forming the bank of the heat exchanger all have the same cooling coefficient, because they all have air at the same temperature flowing through them. This advantage is maintained whether the bank is made of a single sheet of tubes, as shown in the drawings, or several sheets of tubes, as may be provided.

The number of tubes comprising the various sub-banks may be varied, and the corresponding outputs may be adjusted in such a way as to obtain the desired cooling characteristics as a function of the cooling circuit involved.

What is claimed is:

1. An air cooled engine radiator apparatus for a liquid cooled engine requiring cooling circuits at differing temperatures from a common coolant supply comprising a first elongated fluid tank having at least one inlet neck and at least one outlet neck, a second elongated fluid tank having at least one outlet neck, a bank of heat exchanger tubes being mounted at one end on said first fluid tank to be in fluid communication therewith and at the other end on said second fluid tank to be in fluid communication therewith, said first and second fluid tanks being divided into a plurality of compartments separated by internal partitions extending transversely with respect to the longitudinal direction of said first and second fluid tanks, which longitudinal direction is perpendicular to the direction of the tubes of said bank, said compartments dividing said bank of heat exchanger tubes into a plurality of coolant flow paths comprising a main sub-bank and at least one secondary sub-bank, said main sub-bank including a larger number of heat exchange tubes than employed in said at least one, or each, secondary sub-bank, the fluid flow path in said main sub-bank being in a single directional pass while the fluid flow path in said at least one secondary sub-bank being in opposed directional passes; and outlet connection means being provided on said first and second fluid tanks to permit connection of said main sub-bank and said at least one secondary sub-bank to a cooling circuit of said engine.

2. An apparatus as defined by claim 1, characterized in that the bank (10) includes one main sub-bank (FP) for cooling said engine, and one secondary sub-bank (FS) for cooling the oil.

3. An apparatus as defined by claim 1, characterized in that the bank (10) includes one main sub-bank (FP) and two sub-banks (FS1, FS2).

4. An apparatus as defined by claim 1 characterized in that the first fluid tank (18) includes one main compartment (24) into which said at least one inlet neck (34) discharges that is arranged to be connected to a source of coolant, and a plurality of secondary compartments (56, 58, 60 and 62) separated from the main compartment by a plurality of partitions, said second fluid tank (22) includes a main compartment (38) having a main discharge outlet neck (48) that is arranged to be connected to a main cooling circuit and a plurality of secondary compartments (68, 70, 72 and 74) separated from the main compartment by a plurality of partitions, and wherein said main sub-bank (FP) is in fluid communication with said main compartments of said first and second fluid tanks, said at least one sub-bank comprising a plurality of sub-banks (FS1, FS2) in fluid communication with said secondary compartments of said first and second fluid tanks; and wherein said secondary compartments of said first fluid tank include plural secondary outlets to provide connection to secondary cooling circuits.

5. An apparatus as defined by claim 4, characterized in that the main compartment (24) of the first fluid tank (18) communicates with a secondary compartment (56) of the same fluid tank, via at least one tube of the sub-bank (FS1) connecting the main compartment (24) of the first fluid tank (18) to a secondary compartment (68) of the second fluid tank (22), and via at least one other tube of the sub-bank (FS1) connecting this latter secondary compartment (68) with the secondary compartment (56) of the first fluid tank.

6. An apparatus as defined by claim 5 including a fluid flow control opening (78) between said sub-bank (FS1) and the next adjacent sub-bank (FS2).

7. An apparatus as defined by claim 1 characterized in that the first fluid tank (18) includes one main compartment (24) into which said at least one inlet neck (34) discharges that is arranged to be connected to a source of coolant, and a plurality of secondary compartments (26, 28) separated from the main compartment by partitions (30, 32), said second fluid tank (22) includes a main compartment (38) having a main discharging outlet neck (48) that is arranged to be connected to a main cooling circuit, and a plurality of secondary compartments (40, 42) separated from the main compartment by partitions (44, 46), and wherein said main sub-bank (FP) is in fluid communication with said main compartments of said first (18) and second (22) fluid tanks and said at least one secondary sub-bank comprises a single sub-bank (FS) in fluid communication with said secondary compartments of said first and second fluid tanks; and wherein said at least one outlet neck in said first fluid tank (18) comprises an outlet neck (36) in fluid communication with said secondary sub-bank to provide connection to a secondary cooling circuit.

8. An apparatus as defined by claim 7 characterized in that the main compartment (24) of the first fluid tank is in fluid communication with said plurality of secondary compartments in said first fluid tank by means of a calibrated flow opening.

9. An apparatus as defined by claim 1 characterized in that the first fluid tank (18) includes one main compartment (24) into which said at least one inlet neck (34) discharges that is arranged to be connected to a source of coolant, said main compartment including a chamber (86) and a secondary compartment (82) separated from the main compartment by a partition (84), said second fluid tank (22) includes a main compartment (38) having a main discharge outlet neck (48) that is arranged to be connected to a main cooling circuit, and a plurality of secondary compartments (90, 92, 94) separated from the main compartment by a plurality of partitions and wherein said main sub-bank (FP) is in fluid communication with said main compartments of said first and second fluid tanks, said at least one sub-bank comprises a plurality of sub-banks (FS2, FS1) in fluid communication with said chamber (86) and secondary compartment (82) of said first fluid tank (18) and said secondary compartments (90, 92, 94) of said second fluid tank whereby said plurality of sub-banks (FS2, FS1) provide cooling circuits at an outlet neck (96) in said second tank and at an outlet neck (88) in said first tank.

10. An apparatus as defined by claim 9 characterized in that the chamber (86) in said main compartment (24) permits internal flow reversal for one of said sub-banks (FS2) while permitting external flow around said chamber to another (FS1) of said sub-banks.

11. An apparatus as defined by claim 1 characterized in that the first fluid tank (18) includes one main compartment (24) into which said at least one inlet neck (34) discharges that is arranged to be connected to a source of coolant, and a plurality of secondary compartments (98, 100, 102, 104) separated from the main compartment by a plurality of partitions, said second fluid tank (22) includes a main compartment (38) having a main discharge outlet neck (48) that is arranged to be connected to a main cooling circuit and a plurality of secondary compartments (110, 112, 114, 116) separated from the main compartment by a plurality of partitions, and wherein said main sub-bank (FP) is in fluid communication with said main compartments of said first and second fluid tanks, said at least one sub-bank comprising a plurality of sub-banks (FS1, FS2) in fluid communication with said secondary compartments of said first and second fluid tanks; and wherein said plurality of said sub-banks (FS1, FS2) and associated secondary compartments, respectively, are mounted on opposite sides of said main sub-bank (FP).

12. An apparatus as defined by claim 11 wherein said secondary compartments of said first fluid tank mounted on opposite sides of said main compartment are equipped with an outlet (106, 108) at opposite end portions of said first fluid tank to provide connection to secondary cooling circuits.

13. An air cooled engine radiator apparatus for a liquid cooled engine requiring cooling circuits at differing temperatures from a common coolant supply comprising a first elongated fluid tank (18) having at least one inlet neck and at least one outlet neck, a second elongated fluid tank having at least one outlet neck, a bank (10) of heat exchanger tubes being mounted at one end on said first fluid tank to be in fluid communication therewith and at the other end on said second fluid tank to be in fluid communication therewith, said first and second fluid tanks being divided into a plurality of compartments separated by internal partitions extending transversely with respect to the longitudinal direction of said first and second fluid tanks, which longitudinal direction is perpendicular to the direction of the tubes of said bank, said compartments dividing said bank of heat exchanger tubes into a plurality of coolant flow paths comprising a main sub-bank (FP) and two secondary sub-banks (FS1, FS2), said main sub-bank including a larger number of heat exchange tubes than employed in said secondary sub-banks, the fluid flow path in said main sub-bank being in a single directional pass while the fluid flow path in said secondary sub-banks being in opposed directional passes, and outlet connection means being provided on said first and second fluid tanks to permit connection of said main sub-bank and said secondary sub-banks to a cooling circuit of said engine, said first fluid tank (18) including a main compartment (24) and a plurality of secondary compartments (136, 138, 140, 142, 144), said at least one inlet neck being a main inlet neck (34) discharging into the main compartment (24) and arranged to supply the main sub-bank (FP) and one secondary sub-bank (FS1); and a secondary inlet neck (146) discharging into one of said secondary compartments (138) and arranged to supply another secondary sub-bank (FS2) directly.

* * * * *